(12) United States Patent
Brayer et al.

(10) Patent No.: US 11,172,649 B2
(45) Date of Patent: Nov. 16, 2021

(54) HOLDER FOR A SMART MONITORING TAG FOR COWS

(71) Applicant: SCR ENGINEERS LTD, Netanya (IL)

(72) Inventors: Eyal Brayer, Kfar Monash (IL); Eran Genzel, Oranit (IL)

(73) Assignee: SCR ENGINEERS LTD., Netanya (IL)

(*) Notice: Subject to any disclaimer, the term of this patent is extended or adjusted under 35 U.S.C. 154(b) by 246 days.

(21) Appl. No.: 16/337,507

(22) PCT Filed: Sep. 28, 2017

(86) PCT No.: PCT/IL2017/051093
§ 371 (c)(1),
(2) Date: Mar. 28, 2019

(87) PCT Pub. No.: WO2018/061003
PCT Pub. Date: Apr. 5, 2018

(65) Prior Publication Data
US 2019/0223408 A1 Jul. 25, 2019

Related U.S. Application Data

(60) Provisional application No. 62/400,634, filed on Sep. 28, 2016.

(51) Int. Cl.
*A01K 11/00* (2006.01)
*A01K 27/00* (2006.01)

(52) U.S. Cl.
CPC .......... *A01K 11/006* (2013.01); *A01K 27/001* (2013.01); *A01K 27/005* (2013.01); *A01K 27/006* (2013.01)

(58) Field of Classification Search
CPC .... A01K 1/006; A01K 27/001; A01K 27/006; A01K 27/008; A01K 27/00; A44C 5/007; A44C 5/0015; A44C 5/003
See application file for complete search history.

(56) References Cited

U.S. PATENT DOCUMENTS

| | | | |
|---|---|---|---|
| 85,575 A | 1/1869 | Mexworth |
| 377,588 A | 2/1888 | Walsh, Jr. |
| 584,121 A | 6/1897 | Sanders |
| 818,783 A | 4/1906 | Philippi |
| 823,079 A | 6/1906 | Rais |
| 1,016,752 A | 2/1912 | Leith |
| 1,188,510 A | 6/1916 | Timson |

(Continued)

OTHER PUBLICATIONS

Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.

(Continued)

*Primary Examiner* — Kristen C Hayes (57) ABSTRACT

The present invention provides a quick release monitoring tag holder attached to cow's neck by a collar, comprising a first slot and a second slot configured for accommodating said collar therein; and a recess, provided in between said slots, configured for accommodating an identification tag having an upper portion and relatively smaller bottom portion, which is at least partially accommodated within said recess.

12 Claims, 8 Drawing Sheets

(56) References Cited

U.S. PATENT DOCUMENTS

| | | |
|---|---|---|
| 1,364,137 A | 1/1921 | Pannier |
| 1,759,400 A | 5/1930 | Hobbs |
| 1,843,314 A | 2/1932 | Berntson et al. |
| 1,863,037 A | 6/1932 | Archbold |
| 2,078,827 A | 4/1937 | Ketchum |
| 2,420,020 A | 5/1947 | Snell |
| 2,553,400 A | 5/1951 | Blair |
| 2,570,048 A | 10/1951 | Cooke et al. |
| 3,091,770 A | 6/1963 | McMurray et al. |
| 3,148,426 A * | 9/1964 | Lesser .................. A44B 11/005 24/3.7 |
| 3,261,243 A | 7/1966 | Ellison |
| 3,596,541 A | 8/1971 | Bieganski |
| 3,812,859 A | 5/1974 | Christopherson |
| 3,884,100 A | 5/1975 | Fideldy |
| 3,981,209 A | 9/1976 | Caroff |
| 4,120,303 A | 10/1978 | Villa-Massone et al. |
| 4,121,591 A | 10/1978 | Hayes |
| 4,281,657 A | 8/1981 | Ritchey |
| 4,323,183 A | 4/1982 | Duchin |
| 4,497,321 A | 2/1985 | Fearing et al. |
| 4,516,577 A | 5/1985 | Scott et al. |
| 4,531,520 A | 7/1985 | Reggers et al. |
| 4,552,147 A | 11/1985 | Gardner |
| 4,666,436 A | 5/1987 | McDonald et al. |
| 4,672,966 A | 6/1987 | Haas, Jr. |
| 4,696,119 A | 9/1987 | Howe et al. |
| 4,716,899 A | 1/1988 | Huenefeld et al. |
| 4,819,639 A | 4/1989 | Gardner |
| 4,821,683 A | 4/1989 | Veldman |
| 4,922,582 A | 5/1990 | Flanigan |
| 4,943,294 A | 7/1990 | Knapp |
| 5,022,253 A | 6/1991 | Parlatore |
| 5,056,385 A | 10/1991 | Petersen |
| 5,141,514 A | 8/1992 | van Amelsfort |
| 5,154,721 A | 10/1992 | Perez |
| 5,267,464 A | 12/1993 | Cleland |
| 5,509,291 A | 4/1996 | Nilsson et al. |
| 5,651,791 A | 7/1997 | Zavlodaver et al. |
| 5,778,820 A | 7/1998 | van der Lely et al. |
| 6,007,548 A | 12/1999 | Ritchey |
| 6,016,769 A | 1/2000 | Forster |
| 6,043,748 A | 3/2000 | Touchton et al. |
| 6,053,926 A | 4/2000 | Luehrs |
| 6,095,915 A | 8/2000 | Battista et al. |
| 6,099,482 A | 8/2000 | Brune et al. |
| 6,100,804 A | 8/2000 | Brady et al. |
| 6,113,539 A | 9/2000 | Ridenour |
| 6,114,957 A | 9/2000 | Westrick et al. |
| 6,145,225 A | 11/2000 | Ritchey |
| 6,166,643 A | 12/2000 | Janning et al. |
| 6,172,640 B1 | 1/2001 | Durst et al. |
| 6,232,880 B1 | 5/2001 | Anderson et al. |
| 6,235,036 B1 | 5/2001 | Gardner et al. |
| 6,271,757 B1 | 8/2001 | Touchton et al. |
| 6,297,739 B1 | 10/2001 | Small |
| 6,310,553 B1 | 10/2001 | Dance |
| 6,402,692 B1 | 6/2002 | Morford |
| 6,497,197 B1 | 12/2002 | Huisma |
| 6,502,060 B1 | 12/2002 | Christian |
| 6,510,630 B1 | 1/2003 | Gardner |
| 6,535,131 B1 | 3/2003 | Bar-Shalom et al. |
| 6,569,092 B1 | 5/2003 | Guichon et al. |
| 6,659,039 B1 | 12/2003 | Larsen |
| 6,868,804 B1 | 3/2005 | Huisma et al. |
| 7,016,730 B2 | 3/2006 | Ternes |
| 7,046,152 B1 | 5/2006 | Peinetti et al. |
| 7,137,359 B1 | 11/2006 | Braden |
| 7,296,539 B2 | 11/2007 | Iljas |
| 7,380,518 B2 | 6/2008 | Kates |
| 7,705,736 B1 | 4/2010 | Kedziora |
| 7,843,350 B2 | 11/2010 | Geissler et al. |
| 7,937,861 B1 | 5/2011 | Zacher |
| 8,005,624 B1 | 8/2011 | Starr |
| 8,266,990 B1 | 9/2012 | Janson |
| 8,305,220 B2 | 11/2012 | Gibson |
| 8,478,389 B1 | 7/2013 | Brockway et al. |
| 8,622,929 B2 | 1/2014 | Wilson et al. |
| 8,763,557 B2 | 7/2014 | Lipscomb et al. |
| 8,955,462 B1 | 2/2015 | Golden et al. |
| 9,215,862 B2 | 12/2015 | Bladen et al. |
| 9,311,686 B2 * | 4/2016 | Roush ................ A61B 5/02405 |
| 9,392,767 B2 | 7/2016 | Talt et al. |
| 9,392,946 B1 | 7/2016 | Sarantos et al. |
| 9,449,487 B1 | 9/2016 | Spitalny |
| 9,523,965 B2 * | 12/2016 | Liao ...................... G04G 17/06 |
| 9,648,849 B1 | 5/2017 | Vivathana |
| 9,654,925 B1 | 5/2017 | Solinsky et al. |
| 9,693,536 B1 | 7/2017 | Dana |
| 9,717,216 B1 | 8/2017 | Schlachta et al. |
| 9,743,643 B1 | 8/2017 | Kaplan et al. |
| 9,848,577 B1 | 12/2017 | Brandao et al. |
| 9,861,080 B1 | 1/2018 | Hathway et al. |
| 10,021,857 B2 | 7/2018 | Bailey et al. |
| 10,039,263 B2 | 8/2018 | Teychene et al. |
| 10,045,511 B1 | 8/2018 | Yarden et al. |
| 10,064,391 B1 | 9/2018 | Riley |
| 10,091,972 B1 | 10/2018 | Jensen et al. |
| 10,231,442 B1 | 3/2019 | Chang et al. |
| 10,242,547 B1 | 3/2019 | Struhsaker et al. |
| 10,264,762 B1 | 4/2019 | Lamb |
| 10,352,759 B1 | 7/2019 | Jensen |
| 10,446,006 B1 | 10/2019 | Johnson, Jr. et al. |
| 10,512,430 B1 | 12/2019 | Hladio |
| 10,588,295 B1 | 3/2020 | Riley |
| 10,628,756 B1 | 4/2020 | Kuper et al. |
| 10,638,726 B1 | 5/2020 | Makarychev et al. |
| 10,660,312 B2 * | 5/2020 | Leach .................. A01K 27/001 |
| 10,674,709 B2 * | 6/2020 | Goetzl ................. A01K 27/001 |
| 10,691,674 B2 | 6/2020 | Leong et al. |
| 2001/0027751 A1 | 10/2001 | van den Berg |
| 2002/0010390 A1 | 1/2002 | Guice |
| 2002/0021219 A1 | 2/2002 | Edwards |
| 2002/0091326 A1 | 7/2002 | Hashimoto et al. |
| 2002/0095828 A1 | 7/2002 | Koopman et al. |
| 2002/0154015 A1 | 10/2002 | Hixson |
| 2002/0158765 A1 | 10/2002 | Pape et al. |
| 2003/0004652 A1 | 1/2003 | Brunner et al. |
| 2003/0023517 A1 | 1/2003 | Marsh et al. |
| 2003/0062001 A1 | 4/2003 | Andersson |
| 2003/0066491 A1 | 4/2003 | Stampe |
| 2003/0144926 A1 | 7/2003 | Bodin et al. |
| 2003/0146284 A1 | 8/2003 | Schmit et al. |
| 2003/0149526 A1 | 8/2003 | Zhou et al. |
| 2003/0177025 A1 | 9/2003 | Curkendall et al. |
| 2003/0201931 A1 | 10/2003 | Durst et al. |
| 2003/0208157 A1 | 11/2003 | Eidson |
| 2003/0221343 A1 | 12/2003 | Volk |
| 2003/0229452 A1 | 12/2003 | Lewis |
| 2004/0066298 A1 | 4/2004 | Schmitt et al. |
| 2004/0078390 A1 | 4/2004 | Saunders |
| 2004/0118920 A1 | 6/2004 | He |
| 2004/0123810 A1 | 7/2004 | Lorton et al. |
| 2004/0177011 A1 | 9/2004 | Ramsay et al. |
| 2004/0201454 A1 | 10/2004 | Waterhouse et al. |
| 2005/0010333 A1 | 1/2005 | Lorton et al. |
| 2005/0026181 A1 | 2/2005 | Davis et al. |
| 2005/0097997 A1 | 5/2005 | Hile |
| 2005/0108912 A1 | 5/2005 | Bekker |
| 2005/0115508 A1 | 6/2005 | Little |
| 2005/0128086 A1 | 6/2005 | Brown et al. |
| 2005/0139168 A1 | 6/2005 | Light et al. |
| 2005/0145187 A1 | 7/2005 | Gray |
| 2005/0273117 A1 | 12/2005 | Teychene |
| 2005/0279287 A1 | 12/2005 | Kroeker |
| 2005/0284381 A1 | 12/2005 | Bell et al. |
| 2006/0011145 A1 | 1/2006 | Kates |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser |
| 2006/0117619 A1 | 6/2006 | Costantini |
| 2006/0155172 A1 | 7/2006 | Rugg |
| 2006/0170561 A1 | 8/2006 | Eyal |

(56) References Cited

U.S. PATENT DOCUMENTS

| | | |
|---|---|---|
| 2006/0173367 A1 | 8/2006 | Stuart et al. |
| 2006/0185605 A1 | 8/2006 | Renz et al. |
| 2006/0201436 A1 | 9/2006 | Kates |
| 2006/0207515 A1 | 9/2006 | Palett |
| 2006/0241521 A1 | 10/2006 | Cohen |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1 | 1/2007 | Trost |
| 2007/0021660 A1 | 1/2007 | DeLonzor et al. |
| 2007/0027375 A1 | 2/2007 | Melker et al. |
| 2007/0027377 A1 | 2/2007 | DeLonzor et al. |
| 2007/0027379 A1 | 2/2007 | Delonzor et al. |
| 2007/0029381 A1 | 2/2007 | Braiman |
| 2007/0044317 A1 | 3/2007 | Critelli |
| 2007/0044732 A1 | 3/2007 | Araki et al. |
| 2007/0062457 A1 | 3/2007 | Bates et al. |
| 2007/0069899 A1 | 3/2007 | Shih et al. |
| 2007/0103296 A1 | 5/2007 | Paessel et al. |
| 2007/0149871 A1 | 6/2007 | Sarussi et al. |
| 2007/0152825 A1 | 7/2007 | August et al. |
| 2007/0222624 A1 | 9/2007 | Eicken et al. |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler |
| 2008/0017126 A1 | 1/2008 | Adams et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman et al. |
| 2008/0061990 A1 | 3/2008 | Milnes et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton et al. |
| 2008/0110406 A1 | 5/2008 | Anderson |
| 2008/0146890 A1 | 6/2008 | LeBoeuf et al. |
| 2008/0163827 A1 * | 7/2008 | Goetzl ............... A01K 27/006 119/712 |
| 2008/0173255 A1 | 7/2008 | Mainini et al. |
| 2008/0190202 A1 | 8/2008 | Kulach et al. |
| 2008/0190379 A1 | 8/2008 | Mainini et al. |
| 2008/0215484 A1 | 9/2008 | Oldham |
| 2008/0227662 A1 | 9/2008 | Stromberg et al. |
| 2008/0228105 A1 | 9/2008 | Howell et al. |
| 2008/0262326 A1 | 10/2008 | Hete et al. |
| 2008/0272908 A1 | 11/2008 | Boyd |
| 2008/0312511 A1 | 12/2008 | Osler et al. |
| 2009/0009388 A1 | 1/2009 | Wangrud |
| 2009/0020613 A1 | 1/2009 | Chang et al. |
| 2009/0025651 A1 | 1/2009 | Lalor |
| 2009/0058730 A1 | 3/2009 | Gessler et al. |
| 2009/0094869 A1 | 4/2009 | Geissler et al. |
| 2009/0102668 A1 | 4/2009 | Thompson et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0255484 A1 | 10/2009 | Muelken |
| 2009/0312667 A1 | 12/2009 | Utsunomiya et al. |
| 2010/0018363 A1 | 1/2010 | Chervenak et al. |
| 2010/0030036 A1 | 2/2010 | Mottram et al. |
| 2010/0045468 A1 | 2/2010 | Geissler |
| 2010/0113902 A1 | 5/2010 | Hete et al. |
| 2010/0139575 A1 | 6/2010 | Duncan et al. |
| 2010/0160809 A1 | 6/2010 | Laurence et al. |
| 2010/0175625 A1 | 7/2010 | Klenotiz |
| 2010/0217102 A1 | 8/2010 | LeBoeuf et al. |
| 2010/0250198 A1 | 9/2010 | Lorton et al. |
| 2010/0289639 A1 | 11/2010 | Gibson et al. |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Afikim et al. |
| 2011/0018717 A1 | 1/2011 | Takahashi et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0132275 A1 * | 6/2011 | Huo ..................... A01K 27/009 119/720 |
| 2011/0137185 A1 | 6/2011 | Hete et al. |
| 2011/0152876 A1 | 6/2011 | Vandeputte |
| 2011/0178423 A1 | 7/2011 | Hatch |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete |
| 2012/0009943 A1 | 1/2012 | Greenberg et al. |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0236690 A1 | 9/2012 | Rader et al. |
| 2012/0291715 A1 | 11/2012 | Jiang et al. |
| 2012/0299731 A1 | 11/2012 | Triener |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0014706 A1 | 1/2013 | Menkes |
| 2013/0046170 A1 | 2/2013 | Haynes |
| 2013/0113622 A1 | 5/2013 | Pratt et al. |
| 2013/0119142 A1 | 5/2013 | McCoy |
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0285815 A1 | 10/2013 | Jones, II |
| 2014/0073486 A1 | 3/2014 | Ahmed et al. |
| 2014/0122488 A1 | 5/2014 | Jung et al. |
| 2014/0123912 A1 | 5/2014 | Menkes et al. |
| 2014/0135596 A1 | 5/2014 | LeBoeuf et al. |
| 2014/0135631 A1 | 5/2014 | Brumback et al. |
| 2014/0171762 A1 | 6/2014 | LeBoeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0347184 A1 | 11/2014 | Triener |
| 2014/0352632 A1 | 12/2014 | McLaughlin |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |

(56) References Cited

U.S. PATENT DOCUMENTS

| | | |
|---|---|---|
| 2015/0182322 A1 | 7/2015 | Couse et al. |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0021506 A1 | 1/2016 | Bonge, Jr. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | LeBoeuf et al. |
| 2016/0135431 A1 | 5/2016 | Siegel |
| 2016/0148086 A1 | 5/2016 | Clarke et al. |
| 2016/0150362 A1 | 5/2016 | Shapiro et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | LeBoeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0156288 A1 | 6/2017 | Singh |
| 2017/0164905 A1 | 6/2017 | Gumiero |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma |
| 2017/0280675 A1 | 10/2017 | MacNeil |
| 2017/0280688 A1 | 10/2017 | Deliou et al. |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0055016 A1 | 3/2018 | Hsieh et al. |
| 2018/0064068 A1* | 3/2018 | McKEE ............... H04W 4/023 |
| 2018/0070559 A1 | 3/2018 | So |
| 2018/0098522 A1 | 4/2018 | Steinfort |
| 2018/0110205 A1 | 4/2018 | Czarnecky et al. |
| 2018/0131074 A1 | 5/2018 | Wilkinson et al. |
| 2018/0132455 A1 | 5/2018 | Pradeep et al. |
| 2018/0168128 A1* | 6/2018 | Leach ..................... A01K 15/02 |
| 2018/0206455 A1 | 7/2018 | Thiex et al. |
| 2018/0242860 A1 | 8/2018 | LeBoeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Steinshorn et al. |
| 2018/0333244 A1 | 11/2018 | Hanks et al. |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133084 A1* | 5/2019 | Landers ............... A01K 15/023 |
| 2019/0133086 A1 | 5/2019 | Katz et al. |
| 2019/0159428 A1 | 5/2019 | Bolen |
| 2019/0166802 A1 | 6/2019 | Seltzer et al. |
| 2019/0183091 A1 | 6/2019 | Betts-LaCroix et al. |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2020/0015740 A1 | 1/2020 | Alnofeli et al. |
| 2020/0037886 A1 | 2/2020 | Greer et al. |
| 2020/0068853 A1 | 3/2020 | Radovcic |
| 2020/0085019 A1 | 3/2020 | Gilbert et al. |
| 2020/0100463 A1 | 4/2020 | Rooda et al. |
| 2020/0107522 A1 | 4/2020 | Kersey et al. |
| 2020/0110946 A1 | 4/2020 | Kline et al. |
| 2020/0113728 A1 | 4/2020 | Spector et al. |
| 2020/0170222 A1 | 6/2020 | Gotts |
| 2020/0178505 A1 | 6/2020 | Womble et al. |
| 2020/0178800 A1 | 6/2020 | Geissler et al. |
| 2020/0205381 A1 | 7/2020 | Wernimont et al. |
| 2020/0229391 A1 | 7/2020 | De Groot |
| 2020/0229707 A1 | 7/2020 | Donnelly |
| 2020/0242551 A1 | 7/2020 | Lau et al. |

OTHER PUBLICATIONS

Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, The Journal of Dairy Research; Cambridge vol. 84, Iss. 2, (May 2017): 132-138.

Clark, C., Lyons, N., Millapan, L., Talukder, S., Cronin, G., Kerrisk, K., & Garcia, S. (2015), Rumination and activity levels as predictors of calving for dairy cows, Animal, 9(4), 691-695.

K. Koyama, T. Koyama, M. Sugimoto, N. Kusakari, R. Miura, K. Yoshioka, M. Hirako, Prediction of calving time in Holstein dairy cows by monitoring the ventral tail base surface temperature, The Veterinary Journal, vol. 240, 2018, pp. 1-5, ISSN 1090-0233.

L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.

S. Benaissa, F.A.M. Tuyttens, D. Plets, J. Trogh, L. Martens, L. Vandaele, W. Joseph, B. Sonck, Calving and estrus detection in (56) References Cited

OTHER PUBLICATIONS dairy cattle using a combination of indoor localization and accelerometer sensors, Computers and Electronics in Agriculture, vol. 168, 2020, 105153, ISSN 0168-1699.

N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.

The role of sensors, big data and machine learning in modern animal farming; Suresh Neethirajan; Received Jun. 2, 2020; Received in revised form Jun. 30, 2020; Accepted Jul. 3, 2020 Sensing and Bio-Sensing Research 29 (2020) 100367 2214-1804/ © 2020 The Author. Published by Elsevier B.V.

A Review on Determination of Computer Aid Diagnosis and/or Risk Factors Using Data Mining Methods in Veterinary Field Pinar Cihan, Erhan Gökçe, Oya Kalipsiz; Tekirdağ Namik Kemal University, Çorlu Faculty of Engineering, Department of Computer Engineering, Tekirdağ, Turkey. 2019.

Big Data Analytics and Precision Animal Agriculture Symposium: Data to decisions B. J. White, D. E. Amrine, and R. L. Larson Beef Cattle Institute, Kansas State University, Manhattan, KS; © The Author(s) 2018. Published by Oxford University Press on behalf of American Society of Animal Science.

Gasteiner, J.; Boswerger, B.; Guggenberger, T., Practical use of a novel ruminal sensor on dairy farms, Praktische Tierarzt 2012 vol. 93 No. 8 pp. 730-739 ref.45.

\* cited by examiner

HOLDER FOR A SMART MONITORING TAG FOR COWS

RELATED APPLICATIONS

This application is a National Phase of PCT Patent Application No. PCT/IL2017/051093 having International filing date of Sep. 28, 2017, which claims the benefit of priority of U.S. Provisional Application No. 62/400,634 filed on Sep. 28, 2016. The contents of the above applications are all incorporated by reference as if fully set forth herein in their entirety.

FIELD OF THE INVENTION

The invention relates to a cow's smart monitoring tag, and to a quick release identification tag holder in connection with animal neck via a collar. The invention further pertains to tag holding system and to quick releasing methods thereof in which the identification tag is attachable and detachable to the collar without the removal of the collar from the animal.

BACKGROUND OF THE INVENTION

Animal collars, and especially farm collars, are useful means for identification of the animal, analyzing its activity and health state and thereby increasing its productivity, feed and health. Many tags are embedded with RFID modules, processors, accelerators, sensors, MEMS, and communication means, as well as with a sufficient DC electrical power supply, see U.S. Pat. No. 7,350,481, Method and system for monitoring physiological conditions of, and/or suitability of animal feed for ruminant animals and U.S. Pat. No. 7,878,149, Method and device for detecting estrus which are incorporated herein as a reference. Those complicated and advanced tags are firmly affixed within housing or irreversibly embedded in the animal's collar, making frequent inspection, maintenance and battery replacing activities slow and tedious and therefore demanding significant time, experience and knowhow. In most cases, a tag replacement or technical observation requires untying the collar, unthreading the collar from the tag's housing and rethreading the collar to the tag's housing after having inspecting the device. A simple, quick and intuitive means and method for the farmer to release the tag from its housing is hence a long felt need.

SUMMARY OF THE INVENTION

It is thus an object of the present invention to disclose a quick release monitoring tag holder attached to cow's neck by a collar, comprising a first slot and a second slot configured for accommodating the collar therein; and a recess, provided in between the slots, configured for accommodating an identification tag having an upper portion and relatively smaller bottom portion, which is at least partially accommodated within the recess.

It is another an object of the present invention to disclose a quick release monitoring tag holder as described in any of the above, utilizable in a manner that the identification tag is at least partially accommodated within the recess and the collar passes through the first slot from collar's inner side toward collar's outer side, over the upper portion of the identification tag, and through the second slot from the outer side toward the inner side, whereby the tag is held in place by the collar and can be removed from the recess without removal of the collar from animal's neck.

It is another an object of the present invention to disclose a quick release monitoring tag holder as described in any of the above, further comprising at least one aperture between at least one slot and the tag holder recess, configured to allow the passage of at least a portion of the collar.

It is another an object of the present invention to disclose a quick release monitoring tag holder as described in any of the above, the tag holder further comprising a securing means configured for the tag to fit snugly within the housing recess and ensure its accommodation there.

It is another an object of the present invention to disclose a quick release monitoring tag holder as described in any of the above, the tag further comprising a securing means configured for the tag to fit snugly within the housing recess and ensure its accommodation there.

It is another an object of the present invention to disclose a quick release monitoring tag holder as described in any of the above, wherein at least one securing means comprises at least one static, dynamic, and any combination thereof, protruding member.

It is another an object of the present invention to disclose a quick release monitoring tag holder as described in any of the above, herein at least one member is reversibly retractable by application of pressure on at least a portion thereof.

It is thus an object of the present invention to disclose a quick release monitoring tag holder attached to cow's neck by a collar; the holder having a main longitudinal axis and comprising a recess, provided in parallel to the axis, having a width and a length with two opposites ends, the length is provided useful for accommodating both (a) a bottom portion of an identification tag when assembled, and (b) at least one segment of a collar which passes in between the recess' first end and the identification tag from holders inner side towards collar's outer side, over the upper portion of the identification tag, and in between the recess' second end and the identification tag from collar's outer side toward the inner side, thereby at least temporarily holding the tag within the recess by the collar.

It is another an object of the present invention to disclose a quick release monitoring tag holder as described in any of the above, further comprising at least one aperture between at least one slot and the tag holder recess, configured to allow the passage of at least a portion of the collar.

It is another an object of the present invention to disclose a quick release monitoring tag holder as described in any of the above, the tag holder further comprising a securing means configured for the tag to fit snugly within the housing recess and ensure its accommodation there.

It is another an object of the present invention to disclose a quick release monitoring tag holder as described in any of the above, the tag further comprising a securing means configured for the tag to fit snugly within the housing recess and ensure its accommodation there.

It is another an object of the present invention to disclose a quick release monitoring tag holder as described in any of the above, wherein at least one securing means comprises at least one static, dynamic, and any combination thereof, protruding member.

It is another an object of the present invention to disclose a quick release monitoring tag holder as described in any of the above, at least one member is reversibly retractable by application of pressure on at least a portion thereof.

It is thus an object of the present invention to disclose a quick release monitoring tag holding system for reversible and easy attaching/detaching a tag to and from animal's neck by means of the animal's neck collar, the system comprising: a collar provided in a length to be disposed about a neck of an animal; a tag holder comprising a first slot and a second slot configured for accommodating the collar therein; and a recess, provided in between the slots, configured for accommodating an identification tag having an upper portion and relatively smaller bottom portion, which is at least partially accommodated within the recess.

It is another an object of the present invention to disclose a quick release monitoring tag holder as described in any of the above, utilizable in a manner that the identification tag is at least partially accommodated within the recess and the collar passes through the first slot from collar's inner side toward collar's outer side, over the upper portion of the identification tag, and through the second slot from the outer side toward the inner side, whereby the tag is held in place by the collar and can be removed from the recess without removal of the collar from animal's neck.

It is another an object of the present invention to disclose a quick release monitoring tag holder as described in any of the above, wherein, further comprising at least one aperture between at least one slot and the tag holder recess, configured to allow the passage of at least a portion of the collar.

It is another an object of the present invention to disclose a quick release monitoring tag holder as described in any of the above, wherein, the tag holder further comprising a securing means configured for the tag to fit snugly within the housing recess and ensure its accommodation there.

It is another an object of the present invention to disclose a quick release monitoring tag holder as described in any of the above, wherein, the tag further comprising a securing means configured for the tag to fit snugly within the housing recess and ensure its accommodation there.

It is another an object of the present invention to disclose a quick release monitoring tag holder as described in any of the above, wherein at least one securing means comprises at least one static, dynamic, and any combination thereof, protruding member.

It is another an object of the present invention to disclose a quick release monitoring tag holder as described in any of the above, wherein at least one member is reversibly retractable by application of pressure on at least a portion thereof.

It is thus an object of the present invention to disclose a quick release monitoring tag holding system for reversible and easy attaching/detaching a tag to and from animal's neck by means of the animal's neck collar, the system comprising a collar provided in a length to be disposed about a neck of an animal; a tag holder having a main longitudinal axis and comprising a recess, provided in parallel to the axis, having a width and a length with two opposites ends, the length is provided useful for accommodating both (a) a bottom portion of an identification tag when assembled, and (b) at least one segment of a collar which passes in between the recess' first end and the identification tag from holders inner side towards collar's outer side, over the upper portion of the identification tag, and in between the recess' second end and the identification tag from collar's outer side toward the inner side, thereby at least temporarily holding the tag within the recess by the collar.

It is another an object of the present invention to disclose a quick release monitoring tag holder as described in any of the above, further comprising at least one aperture between at least one slot and the tag holder recess, configured to allow the passage of at least a portion of the collar.

It is another an object of the present invention to disclose a quick release monitoring tag holder as described in any of the above, the tag holder further comprising a securing means configured for the tag to fit snugly within the housing recess and ensure its accommodation there.

It is another an object of the present invention to disclose a quick release monitoring tag holder as described in any of the above, the tag further comprising a securing means configured for the tag to fit snugly within the housing recess and ensure its accommodation there.

It is another an object of the present invention to disclose a quick release monitoring tag holder as described in any of the above, wherein at least one securing means comprises at least one static, dynamic, and any combination thereof, protruding member.

It is another an object of the present invention to disclose a quick release monitoring tag holder as described in any of the above, wherein at least one member is reversibly retractable by application of pressure on at least a portion thereof.

It is thus an object of the present invention to disclose a method for reversibly accommodating and quick releasing a tag to and from the neck of an animal characterized by steps of: (a) providing a tag holder with a first slot and a second slot; (b) configuring each of the slots for accommodating the collar therein; and (c) providing in between the slots a recess and configuring the same for accommodating an identification tag having an upper portion and relatively smaller bottom portion, which is at least partially accommodated within the recess.

It is another an object of the present invention to disclose the method as described in any of the above, useful for further securing the tag to the holder, wherein the method further comprising the steps of: (a) providing securing means in connection with the tag and/or in connection with the holder; and (b) configuring the securing means to fit snugly within the housing recess and ensure tag's accommodation therein.

It is another an object of the present invention to disclose the method as described in any of the above, wherein the method further comprising at least partially accommodated the identification tag within the recess; passing a segment of the collar through the first slot from collar's inner side toward collar's outer side, over the upper portion of the identification tag, and through the second slot from the outer side toward the inner side, thereby by fastening and unfastening the collar or segment thereof reversibly accommodating and quick releasing of the tag to the tag's holder is enabled.

It is thus an object of the present invention to disclose a method for reversibly accommodating and quick releasing a tag to and from the neck of an animal characterized by steps of: (a) providing in parallel to a tag holder's main longitudinal axis a recess; (b) providing the recess with a width and a length having two opposites ends to be useful for accommodating both (a) a bottom portion of an identification tag when assembled, and (b) at least one segment of a collar which passes in between the recess' first end and the identification tag from holders inner side towards collar's outer side, over the upper portion of the identification tag, and in between the recess' second end and the identification tag from collar's outer side toward the inner side; thereby at least temporarily holding the tag within the recess by the collar.

It is another an object of the present invention to disclose the method as described in any of the above, useful for further securing the tag to the holder, wherein the method further comprising the steps of: (a) providing securing means in connection with the tag and/or in connection with the holder; and (b) configuring the securing means to fit snugly within the housing recess and ensure tag's accommodation therein.

It is thus an object of the present invention to disclose a method for reversibly accommodating and quick releasing a tag to and from the neck of an animal characterized by steps of: (a) providing a quick release monitoring tag holding system with a collar provided in a sufficient length to be disposed about a neck of an animal; and with a tag's holder; (b) providing the tag's holder with a first slot and a second slot and configuring the same for accommodating the collar therein; further providing in between the slots a recess, and configuring the same for accommodating an identification tag having an upper portion and relatively smaller bottom portion, which is at least partially accommodated within the recess.

It is another an object of the present invention to disclose the method as described in any of the above for accommodating at least a portion of the identification tag within the recess by passing the collar or a segment thereof through the first slot from collar's inner side toward collar's outer side, over the upper portion of the identification tag, and through the second slot from the outer side toward the inner side, thereby holding the tag in place within sad recess by the collar in a manner it can be removed from the recess without removal of the collar from animal's neck.

It is thus an object of the present invention to disclose a method for reversibly accommodating and quick releasing a tag to and from the neck of an animal characterized by steps of: (a) providing a quick release monitoring tag holding system with a collar provided in a length to be disposed about a neck of an animal and tag's holder; (b) providing the tag's holder with a main longitudinal axis and providing a recess, in parallel to the axis; and, (c) configuring the recess with a width and a length with two opposites ends, in a manner that it provided useful for accommodating both (a) a bottom portion of an identification tag when assembled, and (b) at least one segment of a collar which passes in between the recess' first end and the identification tag from holders inner side towards collar's outer side, over the upper portion of the identification tag, and in between the recess' second end and the identification tag from collar's outer side toward the inner side; thereby at least temporarily holding the tag within the recess by the collar.

BRIEF DESCRIPTION OF THE FIGURES

Preferred embodiments of the present invention will now be described, by way of example only, with reference to the accompanying drawings, in which.

DETAILED DESCRIPTION OF THE PREFERRED EMBODIMENT

Figures 1, 2A:
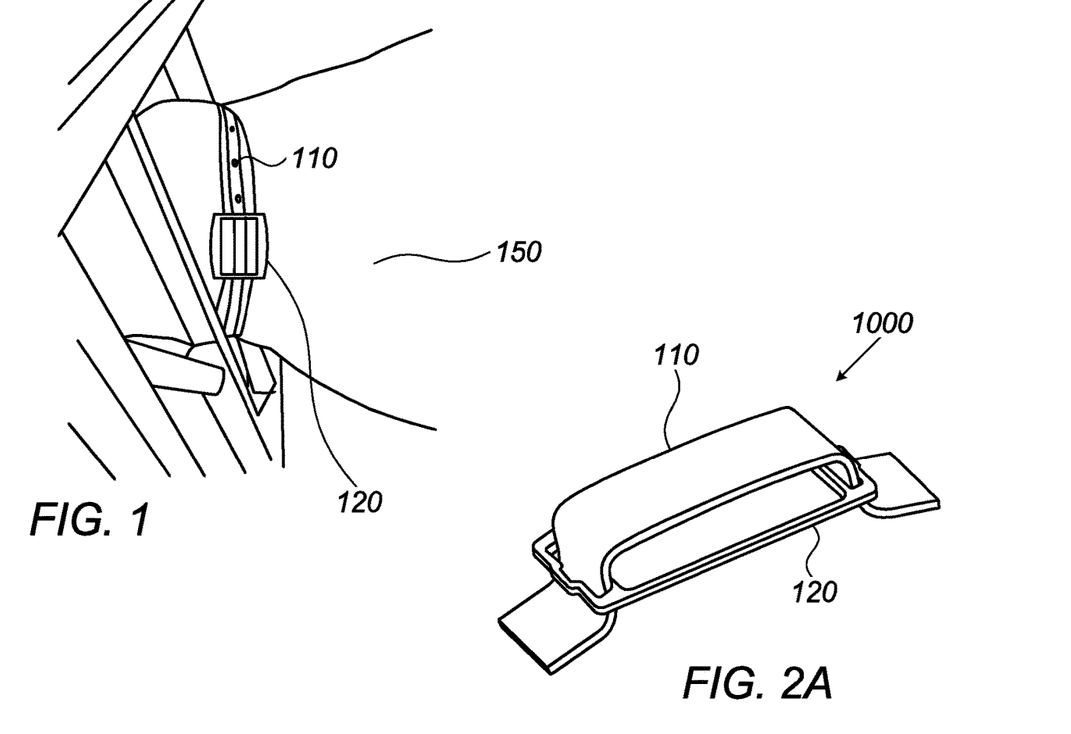
FIG. 1 show a cow's collar attached to a quick release tag holder according to an embodiment of the invention.
FIG. 2A-2C show a quick release tag holder system according to an embodiment of the invention.

Reference is now made to FIG. 1, showing a side view of a cow in connection with a quick release tag holder system (QRTHS) and modules thereof according to one embodiment of the present invention. QRTHS comprises, inter alia, a collar (110) disposed about a tubular organ of an animal, e.g., the neck of a cow (150) and a tag holder (120). A tag (130, hidden behind the collar and therefore not clearly seen here) is compressed between the collar and the holder. In case maintenance is scheduled, the battery is to be replaced, etc., the collar is unfastened, the tension upon the tag is relieved and thereby the tag is easily removed from its location, without the need for completely opening the collar, unthreading the collar from the holder's slots (i.e., a slotted or otherwise opened portion) and rethreading the collar into the holder's recess once the new tag or the new battery is in place, or other maintenance has been carried out.

Figure 2B:
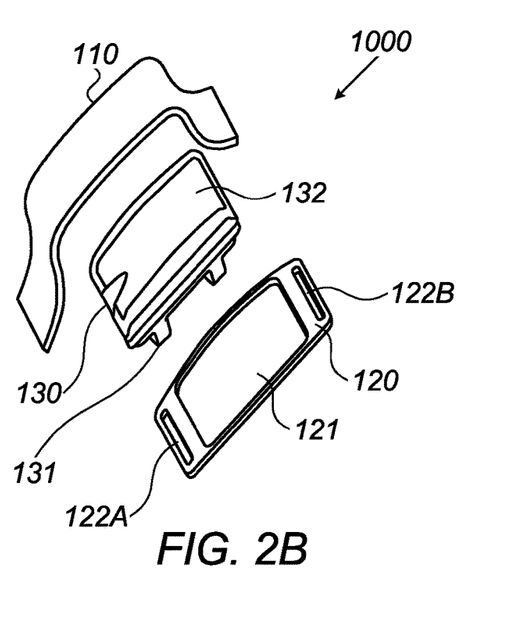
Figure 2C:
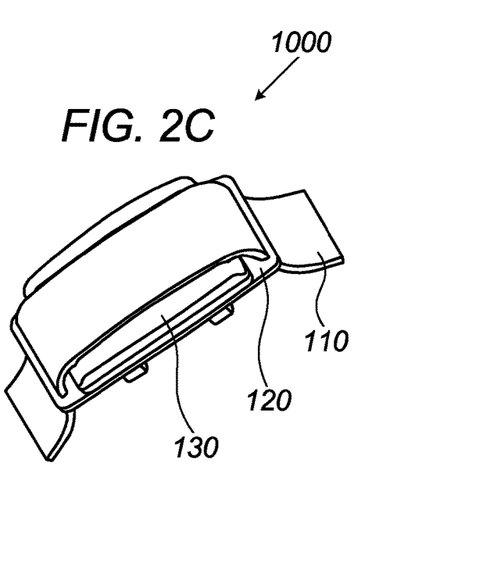

Reference is now made to FIGS. 2A, 2B and 2C illustrating perspective views of one portion of the QRTHS (1000) and modules thereof, namely an endless flexible collar (110) threaded in two of the holder's (120) slots; providing, when the collar is not well fastened, a gap into which a tag (130) can be inserted or removed. An exploded view of the same is presented in FIG. 2B, showing the holder's two slots (122A and 122B) through which the collar is threaded, and a patterned recess (121) configured by means of size and shape to reversibly yet firmly accommodate a tag (130). FIG. 2C presents the same, where the collar (110) is fastened upon the tag (130) when its sits within the holder's patterned recess.

Figure 3A:
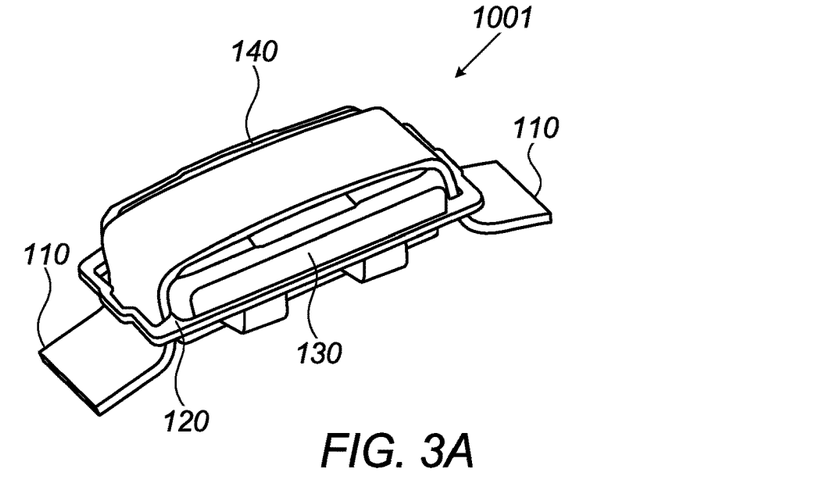
FIG. 3A-3B show a tag configured according to the herein disclosed holder and quick release system according to an embodiment of the invention.
Figure 3B:
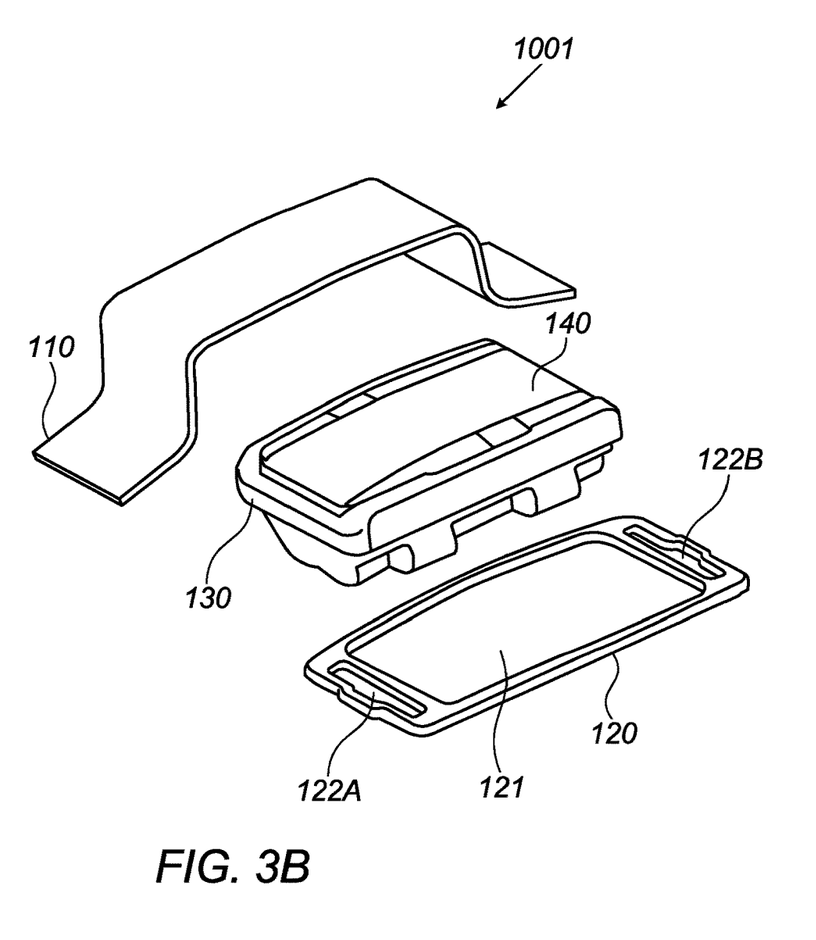
Figures 4A, 4B:
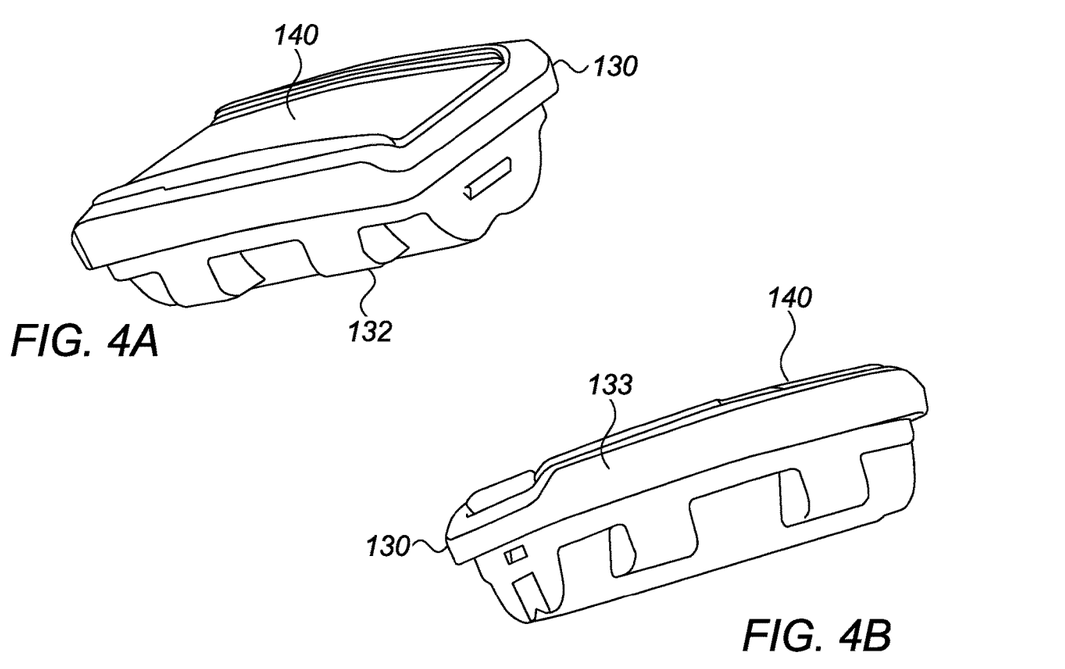
FIGS. 4A-4D show a quick release tag holder system according an embodiment of the invention.
Figures 4C, 4D:
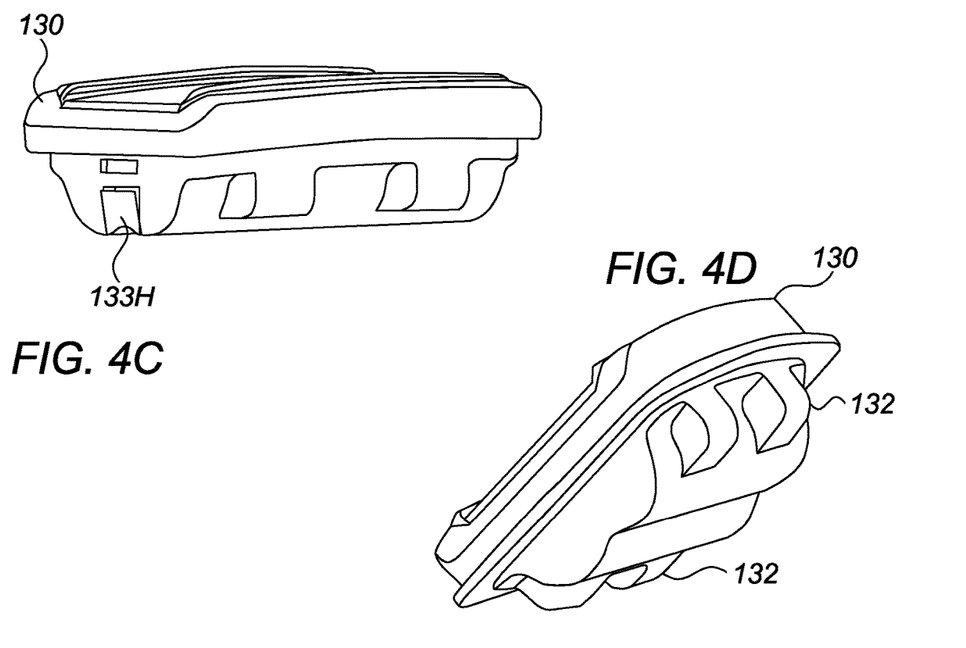

Reference is now made to FIGS. 3A and 3B illustrating perspective views of one portion of QRTHS (1001) and modules thereof. FIG. 3A illustrates a tag (130) housed within a tag holder (120) held in location by a collar (110) passing on top the upper surface (140) of the tag (130). FIG. 3B illustrates an exploded view of a collar (110), a tag (130) having an upper surface (140) which is configured to accept the collar (e.g., having a recess which is configured to have a width and thickness at least as great as the collar's). The tag holder comprises a recesses (121) into which the tag is at least partly inserted. Additionally or alternatively, the tag holder (120) further comprises at least one slot (122A, 122B) on either side of the recess (121) or a plurality of slots. The slots (122a, 122B) are configured to allow passage of at least a portion of the collar (110). In this embodiment the slots (122A, 122B) are closed apertures. Alternatively, the slots (122a, 122B) are at least partially open towards the main recess (121) of the tag holder (120). In some variants, in the tag's opposite surface, the one facing the holder, one or more protruding elements can be provided, configured to increase the tag's fixation within the holder.

Reference is now made to FIG. 4A-D illustrating perspective views of a tag (130) further comprising a securing means adapted to ensure accommodation of the tag within said recess. According to an embodiment of the invention, the securing means comprises one or more protruding elements (135, 136, 133, 133L, 133H). In an embodiment, the tag (130) comprises an upper, external side (132) larger than the bottom portion (131) of the tag. The bottom portion is configured for easy insertion into the tag holder (120). Additionally or alternatively, the bottom portion (131) of the tag (130) includes protruding elements (135, 136, 133, 133L, 133H) that facilitate tag griping by the person installing the tag, and/or configured to provide snap connections into the tag holder thereby allow the tag to click-in within the holder's recess.

It is well within the scope of the invention wherein the tag (130) can be characterized on its lower, holder, side (131) by at least one smaller diameter region (See 138, FIG. 4C) and at least one relatively wider diameter region (137 in FIG. 4C), configured to ensure that removal of the tag from the holder recess (which is characterized by a medium-size diameter) occurs solely in the one desired direction, namely upwardly. This is additionally supported by the tag's (130) upper portion (132) comprising a wider diameter portion (139) than the tag holder recess (120, FIG. 3B).

It is also well within the scope of the invention wherein the tag is characterized by a static (135, FIG. 4A) or dynamic tooth (136, FIG. 4C) adapted to anchor the tag within the holder recess on at least one side. Hence, a single tooth (e.g., clumping protruding member, extracting tooth, movable or static latch, snappable member etc.), provide as tag's securing means, enables the tag to fit snugly within the housing recess and ensure its accommodation there. Likewise, an interlocking lid (much like a pressure cooker) can be utilized as tag's securing means.

Figure 5A:
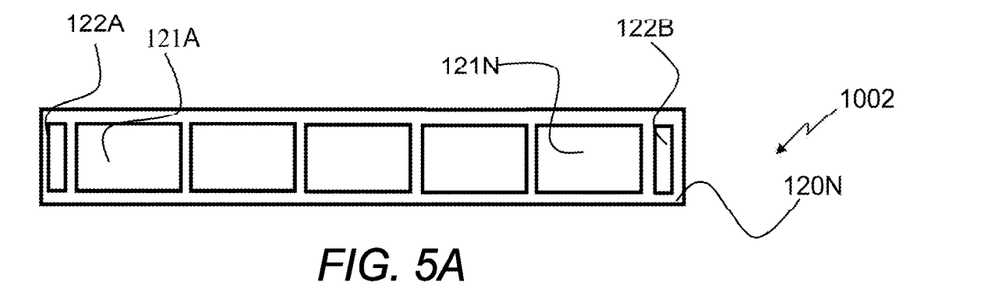
FIG. 5A-5C show multi-modality, multi-cell and multi-tag quick release tag holding system according to an embodiment of the invention.
Figure 5B:
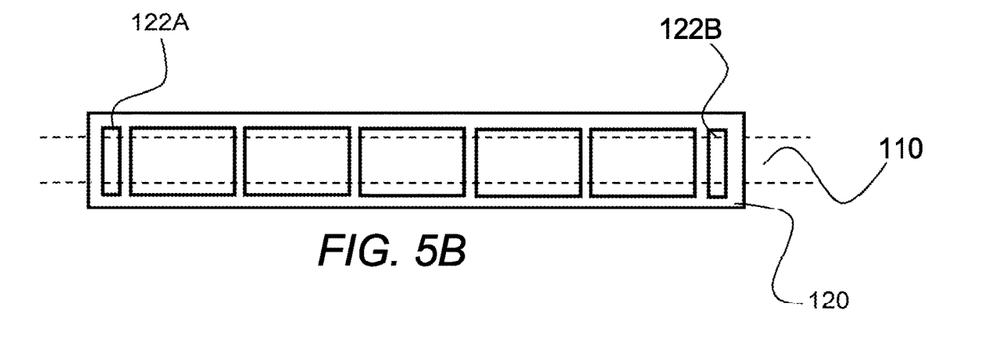
Figure 5C:
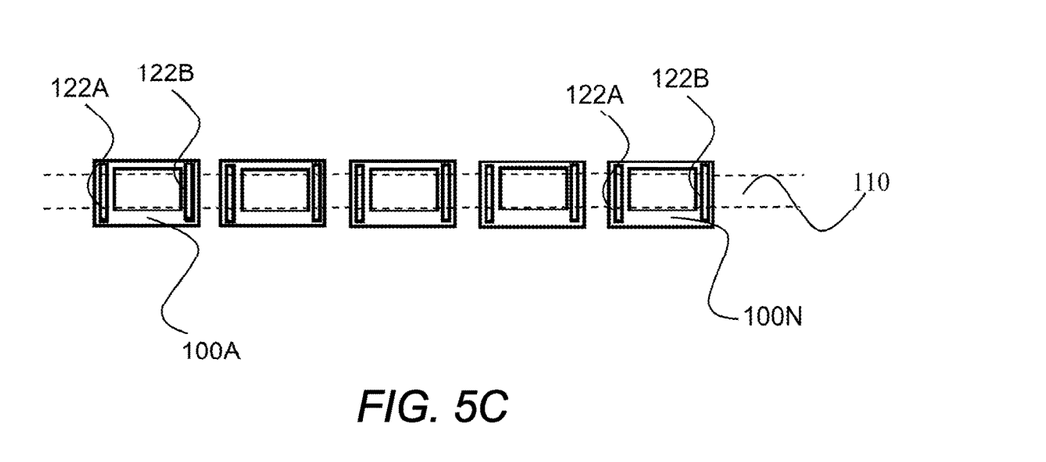

Reference is now made to FIG. 5A-C illustrating top schematic views of a QRTHS (1002) and modules thereof according to an embodiment of the invention. FIG. 5A discloses an elongated multi-cell tag holder (120N) comprising two slots through which the collar is inserted or to which it is otherwise connected (122A, 122B). Holder 120N comprises a plurality of tag cells (121A ... 121N) into which tags (130A ... 130N) are inserted. It is in the scope of the invention wherein the multi-tag holder 120N is elongated and/or widened so that the cells can be provided in a linear sequence, in a rounded (e.g., circular, elliptical, oval) sequence, a hexagonal sequence, having two or more rows of cells, etc. FIG. 5B discloses the same, where the collar 110 is threaded into the holder's slots 122A and 122B. FIG. 5C discloses the same, where the collar 110 is threaded into the holder's slots 122A and 122B by means of a multi-tag holder kits functioning like the TQRK shown in FIG. 2A.

It is in the scope of the invention wherein a QRTHS (1000) is disclosed. The QRTHS comprises, inter alia, a collar (110) disposed about a neck of an animal (150); attaching means which comprise e.g., one or more indentations (133) configured to at least partially hold a tag (130); a tag holder (120) which comprises an inner side and an outer side; a first slot (122A) and a second slot (122B), each of the slots having dimensions to accommodate the collar (110) and, a recess (121) in the outer side, configured to accommodate the attaching means (133) at least partially within the recess. The improvement is that QRTHS is assembled such that the attaching means (133) sits within a recess (121) and the collar (110) passes through the first slot (122A) from the inner side toward the outer side, over attaching means (130), and through the second slot (122B) from the outer side toward the inner side, whereby the attaching means (133, 135, 136) are held in place by the collar (110) and can be removed from the recess (121) without removal of the collar (110) from the animal's neck.

In some embodiments, the recess is configured to at least partially accommodate the attaching means (133, 135, 136) whilst holding the tag (130), or whilst not holding the tag (130).

In some embodiments, the tag (130) is selected in a non-limiting manner from a group consisting of a printed label, an electronic chip, an RFID chip, a sensor, a name tag and any combination thereof.

In some embodiments, the tag holder (120) is made of a material selected in a non-limiting manner from a group consisting of plastic, metal, silicon, and any combination thereof.

In some embodiments, the attaching means (133, 135, 136) are made of a material selected in a non-limiting manner from a group consisting of plastic, metal, silicon, and any combination thereof.

In some embodiments, the collar (110) additionally comprises means for adjusting its length.

In some embodiments, the collar (110) additionally comprises fastening means adapted to buckle the collar.

In some embodiments, the animal (150) is selected from a group consisting of humans, such as, but not limited to, hospitalized patients; house animals such as, but not limited to, dogs and cats; farm animals such as, but not limited to, cows, sheep, horses, and pigs; laboratory animals, zoo animals, wild animals to be tracked, etc.

In some embodiments, the attaching means (133) additionally comprises a clip (131) for securing the tag to the attaching means.

In some embodiments, the attaching means (130) additionally comprises at least one protrusion (132) extending outward from at least one side of the collar; the at least one protrusion is adapted to additionally secure the attaching means (130) to the tag holder (120).

It is in the scope of the invention to disclose a quick release tag holder (QRTH, 120), in connection with a collar (110) which is disposed around a neck or other tubular member of an animal. The tag holder (120) is characterized by an inner side and an outer side; at least one first slot (122A) and at least one second slot (122B), each of the slots having dimensions to accommodate the collar. The holder is further characterized by a recess, pattern or groove (121) configured to accommodate one or more tags (130) at least partially within the recess. The improvement is that QRTH (100) is assembled such that the tag (130) sits at least partially within the recess (121) and the collar (110) passes through the first slot (122A) from the inner side toward the outer side, over the tag, and through the second slot (122B) from the outer side toward the inner side, whereby the tag (130) is held in place by the collar (110) and the tag can be removed from the recess (121) without full removal of the collar (110) from the animal's neck.

In some embodiments, the tag comprises attaching means (133) which comprise one or more indentations configured to at least partially hold the tag to the holder. A snap fastener, press stud, popper, jag, ledge or movable or static tooth are also possible arrangements. The recess is configured to at least partially accommodate the tag to be held within it by the attaching means.

In some embodiments, the attaching means (133) additionally comprises a clip (134) for securing the tag to the holder.

In some embodiments, the attaching means (133) additionally comprises at least one protrusion extending outward from at least one side. The protrusion is configured to provide additional securing of the attaching means (130) to the tag holder (120).

It is in the scope of the invention wherein a tag quick release kit for reversibly accommodating at least one tag (TQRK, see e.g., system 1000 in FIG. 2A, system 1001 in FIG. 5C etc.) to an animal is disclosed. The TQRK comprises, inter alia, an elongated retractable collar; l attaching means, at least one of the attaching means comprising an indentation configured to at least partially hold m tags; n tag holders, each of which is sized and shaped to accommodate at least one of the attaching means; each of the tag holders comprising o slits through which the collar is threaded, such that the l attaching means are sandwiched between the elongated retractable collar and the holding device; l, m, n are integers greater than or equal to 1; o is an integer greater than or equal to 2. The improvement is that the tag holder is characterized by at least two configurations: a CLOSED configuration, in which pressure is applied on the attaching means by means of the collar and the tag holder, so as to secure and encase the attaching means; and an OPEN configuration in which no pressure is applied on the attaching means such that the same is reversibly releasable from the tag holder.

Figure 6A:
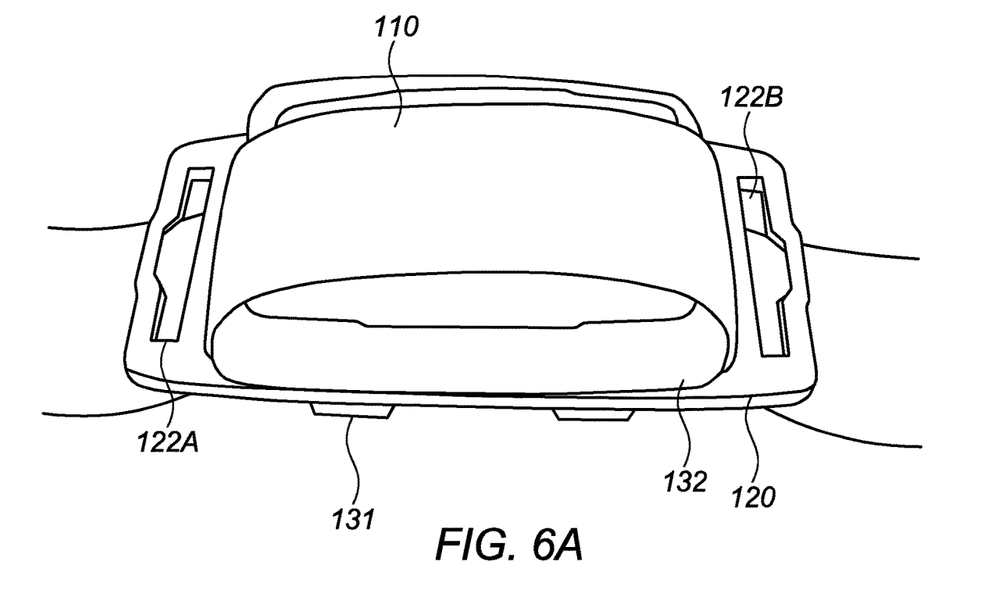
FIGS. 6A-B show a quick release tag holder system according to an embodiment of the invention.
Figure 6B:
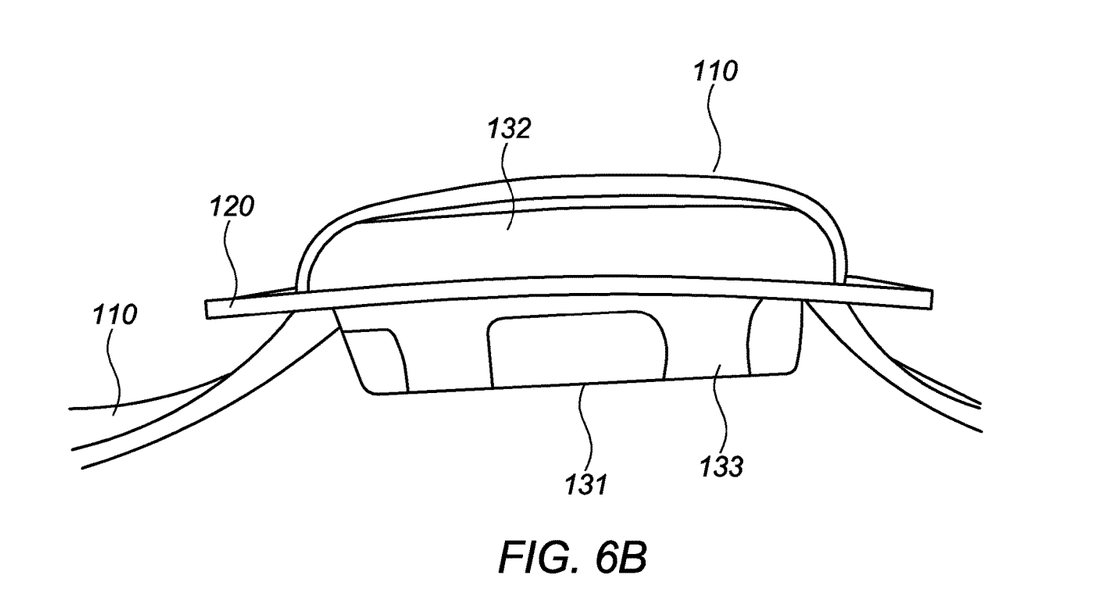

Reference is now made to FIGS. 6A and 6B, providing top view and side view photos, respectively, of another aspect of the invention, wherein the holder (120) does not comprises slots (e.g., 122A and 122B) or does not use them. Here, the endless collar is provided throughout the patterned recess (121) and embraces the tag (130) on top it's upper portion (132) without using the slots. Hence, according to an embodiment of the invention, a cow's smart monitoring tag holder (120) in connection with a collar (110), comprising an inner side and an outer side and a recess in said outer side, configured (i) to accommodate an identification tag (130) at least partially within said recess and (ii) to accommodate said collar provided throughout said recess; wherein said tag holder (120) is utilizable such that said identification tag sits at least partially within said recess and said collar passes through said recess, over said identification tag, whereby said tag is held in place by said collar and can be removed from said recess without removal of said collar from said neck.

In some embodiments of the invention, the tag holder is sized and shaped to at least partially accommodate the attaching means whilst holding the tag or whilst not holding the tag.

In some embodiments of the invention, the attaching means additionally comprise a clip for securing the tag to the attaching means.

In some embodiments of the invention, the attaching means additionally comprise at least one protrusion extending outward from at least one side; the at least one protrusion being adapted to additionally secure the attaching means to the tag holder.

In some embodiments of the invention the tag holder is reversibly transferrable between the closed configuration and the open configuration by means selected from a group consisting of mechanical means, manual means, and any combination thereof.

In some embodiments of the invention, the TQRK is adapted to switch from the closed configuration to the open configuration in a manner selected from a group consisting of continuously, in a binary (open-closed) manner, and any combination thereof.

In some embodiments of the invention, the TQRK is adapted to be worn on a body part of the animal; the body part selected from a group consisting of at least one limb, the neck, the head, and any combination thereof.

It is another object of the invention to disclose a method for accommodating a quick release tag to the neck of an animal. The method is characterized by steps of providing a quick release tag holder system with a collar, a tag holder and attaching means, characterizing tag holder by an inner side and an outer side, providing the tag holder with a first slot and a second slot and a recess in its outer side; further providing the attaching means with an indentation; disposing the collar about the neck or other tubular organ of an animal; placing the tag at least partially within the indentation of the attaching means; accommodating the attaching means at least partially within the recess of the tag holder; passing the collar through the first slot from the inner side toward the outer side, over the attaching means, and through the second slot from the outer side toward the inner side; thereby reversibly accommodating the tag attaching means in place by the collar in a manner that the attaching means are quickly releasable from the recess without removing the collar from the animal's neck.

It is another object of the invention to disclose a method for accommodating a tag to the neck of an animal, characterized by steps of providing a quick release tag holder with a collar and a tag holder; the tag holder characterized by an inner side and an outer side, providing the tag holder with a first slot and a second slot and a recess in the outer side; disposing the collar about the neck or other tubular organ of an animal; accommodating the tag at least partially within the recess; passing the collar through the first slot from the inner side toward the outer side, over the tag, and through the second slot from the outer side toward the inner side; thereby reversibly accommodating the tag in place by the collar in a manner that the tag is quickly releasable from the recess without removing the collar from the animal's neck.

It is in the scope of the invention wherein the aforesaid method additionally comprises a step of providing attaching means and placing the tag at least partially within the attaching means and accommodating the tag placed within the attaching means least partially within the recess. It is in the scope of the invention wherein the step of at least partially placing the tag within the attaching means additionally comprises securing the tag to the attaching means by a clip. It is in the scope of the invention wherein the step of accommodating the attaching means at least partially within the recess of the tag holder additionally comprises securing the attaching means to the tag holder by at least one protrusion extending outward from at least one side of the attaching means.

It is another object of the invention to disclose a method for reversibly accommodating an identification tag on an animal. The method comprises steps of providing at least one system for holding a tag, with an elongated retractable collar, l attaching means comprising an indentation, and m tag holders comprising o slits; l, m are integers greater than or equal to 1 and o is an integer greater than or equal to 2; placing at least one tag at least partially within the indentation of the attaching means; threading the elongated retractable collar through the o slits; accommodating the collar on at least one portion of an animal; sandwiching the attaching means holding the at least one tag between the tag holder and the elongated retractable collar such that they are applying pressure on the attaching means, so as to reversibly secure and encase the attaching means; thereby the at least one attaching means can be reversibly accommodated without the need of taking the collar off the at least one portion of the animal.

In an animal tag operable from a DC power source, it is another object of the invention to disclose a method for replacing or maintaining a tag, the method comprising steps of: providing an animal tag with a DC electrical power source (e.g., a battery), threading a collar through the slits of a tag holder whilst reversibly clutching the tag between the holder and the collar. When maintenance of the tag (e.g., replacement of the battery) is required, releasing the collar, thereby decreasing the pressure which clutches the tag, removing the tag from its position; then performing the maintenance, such as replacing the tag with a fresh one or replacing the battery.

It is another object of the invention to disclose a method for manufacturing an apparatus for holding an identification tag; the method comprising steps of providing an elongated retractable collar and at least one apparatus for holding an identification tag; further providing the device with m holder devices comprising o slits; m is an integer greater than or equal to 1 and o is an integer greater than or equal to 2.

Although particular embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

Figure 7A:
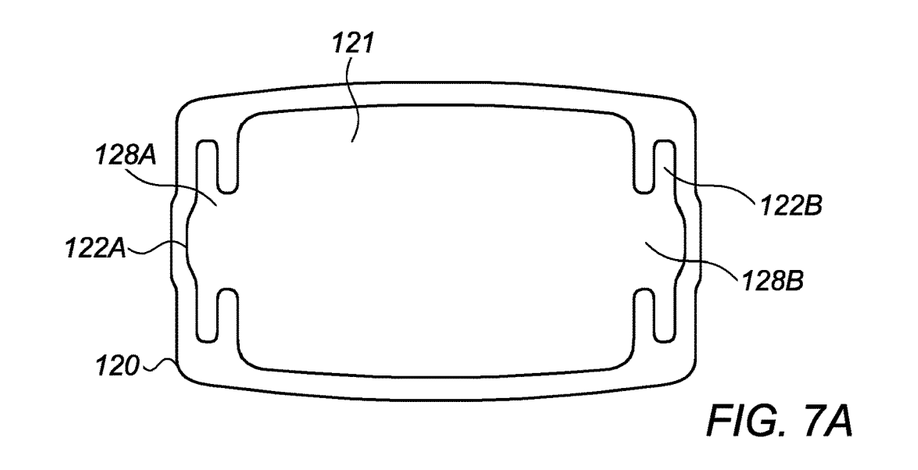
FIGS. 7A-C show a quick release tag holder according to an embodiment of the invention; and, FIGS. 8A-C show a quick release tag holder system according to an embodiment of the invention.
Figure 7B:
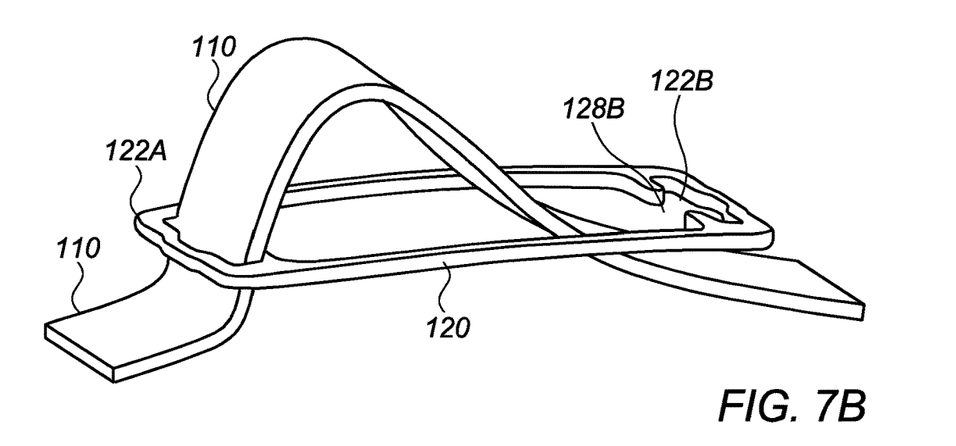
Figure 7C:
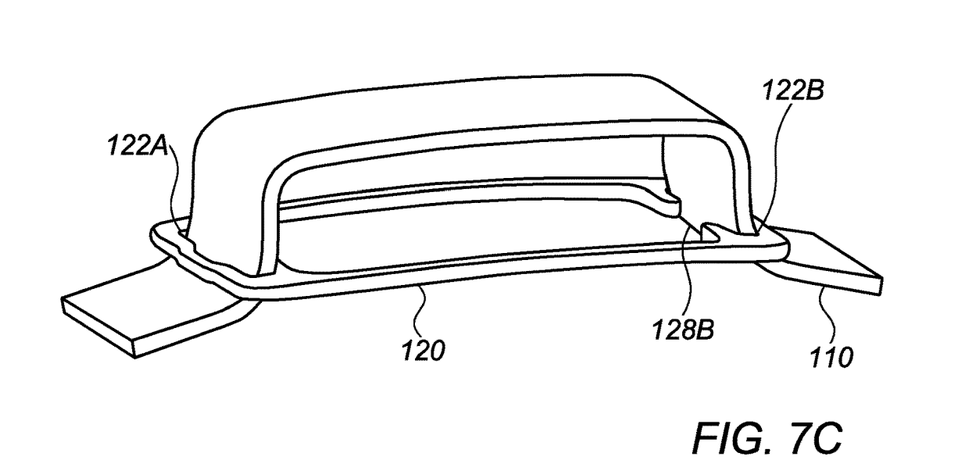

Reference is now made to FIG. 7A-C illustrating a tag holder (120) having a recess (121) along its longitudinal axis configured to accommodate at least a portion of an animal identification tag. The tag holder includes at least one slot (122A, 122B) on either side of the recess longitudinal axis configured to allow passage of at least a portion of a collar (110) or any strap, belt like, string, component. In this embodiment, at least one slot (122A, 122B) comprises an aperture, operatively opening a gap (128A, 128B) from the slot to the recess (121). Thus, the collar (110) passing through each slot can be easily and reversibly attached and detached from the tag holder by passing the collar through the aperture as demonstrated in FIGS. 7B and 7C illustrating the reversible connection of the collar (110) from the recess (121) into the slot (122B), through the aperture (128B). Releasing the tension of the collar by passing it through at least one aperture (128A, 128B), provides means for easy release of a tag temporarily housed within the tag holder (121), otherwise manifested by releasing the collar tension by loosening the containment of the animal by the collar.

Figure 8A:
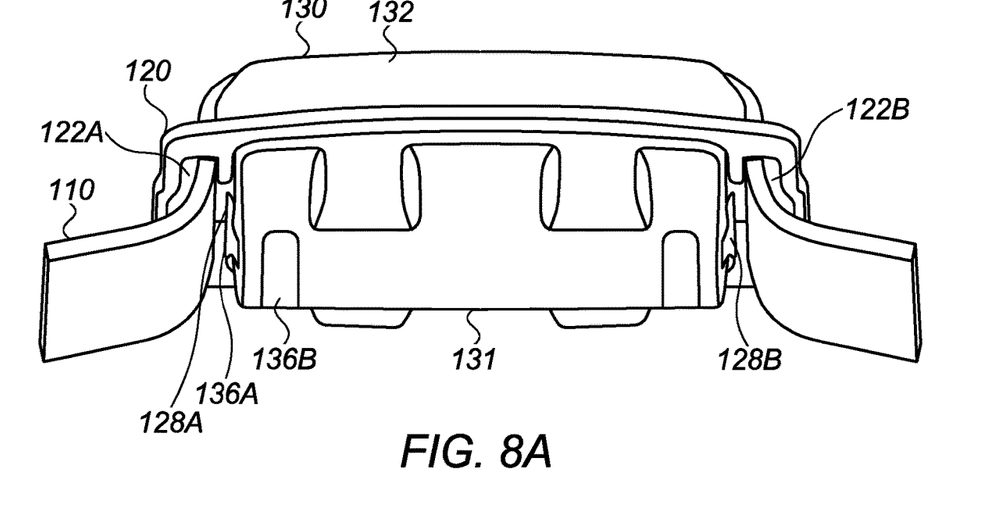
Figure 8B:
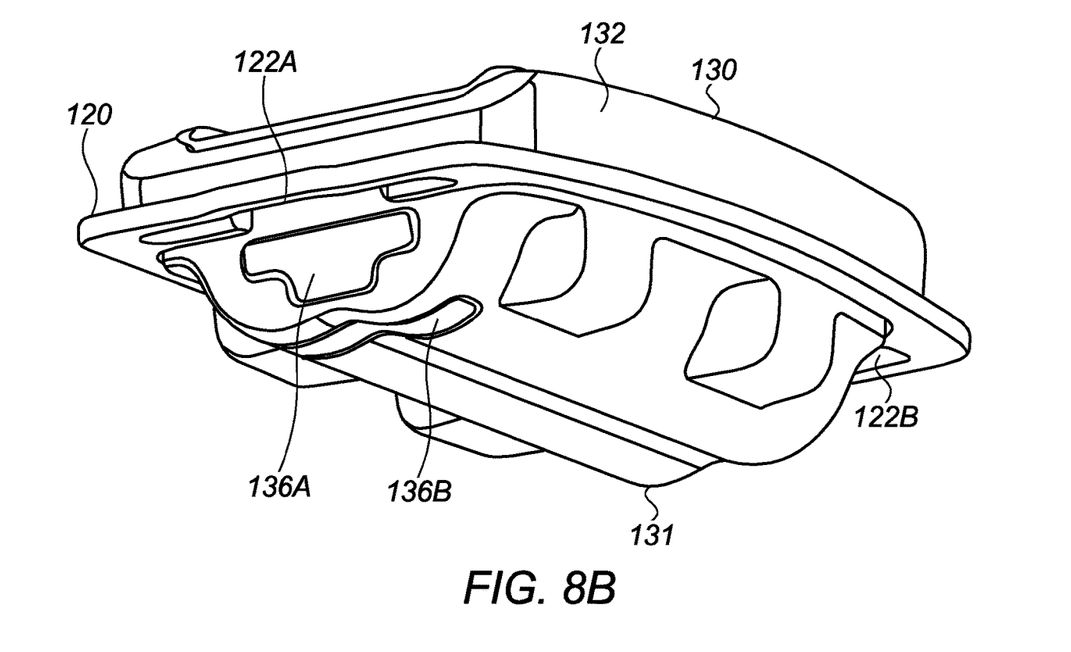
Figure 8C:
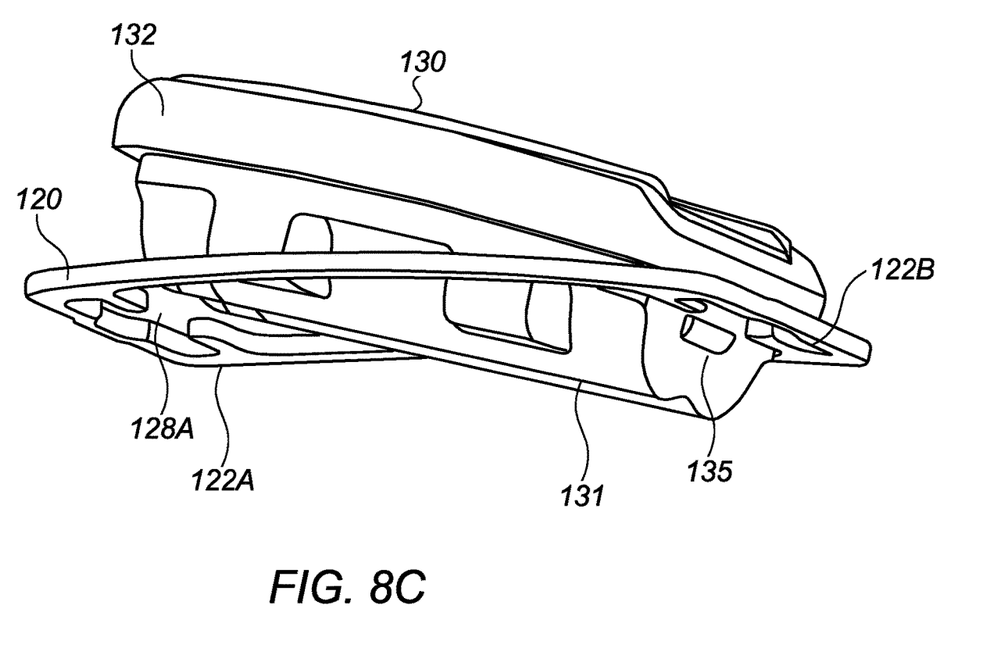

Reference is now made to FIG. 8A-8C illustrating an embodiment of the invention. A system of a quick release identification tag comprising at least one tag (130) temporarily housed within a tag holder (120) and held in position by a collar (110). The tag holder (120) comprises a frame having a longitudinal axis, including a recess configured to receive at least one tag, and at least one slot (122A, 122B) on either side of the longitudinal axis. Further, each slot includes at least one aperture (128A, 128B) thereby creating a passage from the recess to each slot. The collar is inserted into one slot form the bottom of the tag holder, embracing the tag on its upper portion and inserted into the second slot (128B) from the upper side of the tag holder towards the bottom. The tag comprises at least two portions. The upper portion having at least one area with a wider diameter than the bottom portion of the tag. The wider upper portion (132) is larger than the recess (121) of the tag holder (120) thereby the tag (130) inserted therein is resting by means of the wider portion on the tag holder recess circumference, whilst the bottom narrower portion (131) is inserted through the recess. Additionally or alternatively, the tag comprises at least one quick release mechanism comprising a protruding tooth (136A) reversibly retractable by pressing on a connected portion (136B), thereby providing a dynamic means of extraction of the tag from the tag holder, also functioning as securing means when not pressed. Additionally or alternatively, the tag includes a static clip mechanism such as a snip or a protruding element. The protruding element can be at least partly flexible, entirely rigid, and/or have at least one hinge allowing relative movement.

The above description is only to those described as the technical idea of the present invention by way of example, those skilled in the art that various modifications, additions and substitutions are possible, without departing from the essential characteristics of the present invention. Further, the embodiment described in the present invention are for illustrating but not for limiting the technical scope of the present invention, not by such an embodiment is the technical scope of the present invention is not limited. The scope of protection of the invention is to be interpreted by the following claims, all spirits within a scope equivalent will be construed as included in the scope of the present invention.

The invention claimed is:

1. A quick release tag holder system (QRTHS) comprising:
   a collar disposable around a neck of an animal;
   a tag holder comprising an inner side and an outer side, said holder comprising:
     a first slot and a second slot, each of the first slot and the second slot having dimensions to accommodate said collar; and
     a recess provided between the first slot and the second slot; and
   a tag having a bottom portion and an upper portion, said bottom portion having at least one smaller diameter, being smaller than a medium-size diameter of said recess, and said upper portion having a wider diameter, being wider than said medium-size diameter of said recess; said tag further comprising a securing means, said securing means comprising at least one dynamic protruding element configured to provide a snap connection into the tag holder, thereby allowing the tag to click-in within the holder's recess, and reversibly retractable by application of pressure on at least a portion thereof for a quick release of said tag from said recess without removal of the collar from the neck of the animal;
   wherein, when assembled, said bottom portion is at least partially accommodated within said recess, and said collar passes through said first slot from the inner side toward the outer side, over said upper portion of the tag, and through said second slot from the outer side toward the inner side.

2. The QRTHS of claim 1, wherein said tag holder comprises at least one aperture between at least one of the first slot or the second slot and said recess, configured to allow the passage of at least a portion of said collar.

3. The QRTHS of claim 1, wherein said tag comprises a printed label, an electronic chip, a RFID chip, a sensor, a name tag or any combination thereof.

4. The QRTHS of claim 1, wherein said securing means further comprises a static protruding element configured to provide a second snap connection into the tag holder.

5. A quick release tag holder system (QRTHS) attached to a neck of an animal by a collar, said collar being disposable around the neck of the animal, said QRTHS comprising:
   a tag having a bottom portion and an upper portion, said bottom portion having at least one smaller diameter, being smaller than a medium-size diameter of a recess of a tag holder, and said upper portion having a wider diameter being wider than said medium-size diameter of said recess; said tag further comprising a securing means, said securing means comprising at least one dynamic protruding element configured to provide a snap connection into the tag holder, thereby allowing the tag to click-in within the holder's recess, and reversibly retractable by application of pressure on at least a portion thereof for a quick release of said tag from said recess without removal of the collar from the neck of the animal; and said tag holder having a main longitudinal axis, said recess provided in parallel to said axis, and having a width and a length with two opposite ends, said recess accommodating both (a) at least a part of said bottom portion of said tag when assembled, and (b) at least one segment of said collar which passes between said recess' first end and said tag from said holder's inner side towards said holder's outer side, over the upper portion of said tag, and between said recess' second end and said tag from said holder's outer side toward said holder's inner side.

6. The QRTHS of claim 5, wherein said tag holder comprises at least one aperture between at least one slot of said tag holder and said recess, said aperture configured to allow the passage of at least a portion of said collar.

7. The QRTHS of claim 5, wherein said tag comprises a printed label, an electronic chip, a RFID chip, a sensor, a name tag or any combination thereof.

8. The QRTHS of claim 5, wherein said securing means further comprises a static protruding element configured to provide a second snap connection into the tag holder.

9. A quick release tag holder system (QRTHS) comprising:
   a tag holder comprising a first slot and a second slot, each of the first slot and the second slots having dimensions to accommodate a collar, said tag holder further comprising a recess; and
   a tag having a bottom portion and an upper portion, said bottom portion having a smaller diameter than said upper portion;
   wherein said tag comprises securing means comprising at least one dynamic protruding element configured to provide a snap connection into the tag holder, thereby allowing the tag to click-in within the recess, and reversibly retractable by application of pressure on at least a portion thereof for a quick release of said tag from said recess without removal of said collar from a neck of an animal.

10. The QRTHS of claim 9, wherein said tag holder comprises at least one aperture between at least one of the first slot or the second slot and said recess, configured to allow the passage of at least a portion of said collar.

11. The QRTHS of claim 9, wherein said tag comprises a printed label, an electronic chip, a RFID chip, a sensor, a name tag or any combination thereof.

12. The QRTHS of claim 9, wherein said securing means further comprises a static protruding element configured to provide a second snap connection into the tag holder.

* * * * *